United States Patent
Bernadet

(10) Patent No.: US 11,319,059 B2
(45) Date of Patent: May 3, 2022

(54) FRONT LANDING GEAR MODULE FOR AIRCRAFT

(71) Applicant: AIRBUS OPERATIONS (S.A.S.), Toulouse (FR)

(72) Inventor: Philippe Bernadet, Colomiers (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 114 days.

(21) Appl. No.: 16/578,055

(22) Filed: Sep. 20, 2019

(65) Prior Publication Data

US 2020/0094949 A1    Mar. 26, 2020

(30) Foreign Application Priority Data

Sep. 20, 2018    (FR) ..................... 1858504

(51) Int. Cl.
*B64C 25/04*    (2006.01)
*B64C 1/06*    (2006.01)

(52) U.S. Cl.
CPC ............ *B64C 25/04* (2013.01); *B64C 1/0683* (2020.01); *B64C 2211/00* (2013.01)

(58) Field of Classification Search
CPC .... B64C 1/0683; B64C 25/04; B64C 2211/00
See application file for complete search history.

(56) References Cited

U.S. PATENT DOCUMENTS

| | | | | |
|---|---|---|---|---|
| 3,335,981 A * | 8/1967 | Pauli | ........................ | B64C 1/22 244/102 R |
| 6,213,428 B1 * | 4/2001 | Chaumel | ................... | B64C 1/36 244/119 |
| 7,784,736 B2 * | 8/2010 | Guering | .................. | B64C 25/14 244/119 |
| 7,798,444 B2 * | 9/2010 | Wood | ...................... | B64C 1/061 244/102 A |
| 8,256,711 B2 * | 9/2012 | Guering | .................. | B64C 1/061 244/102 R |
| 8,262,020 B2 * | 9/2012 | Guering | .................. | B64C 25/14 244/102 R |
| 8,336,819 B2 * | 12/2012 | De Ruffray | ............. | B64C 25/14 244/102 R |
| 8,840,063 B2 * | 9/2014 | Lieven | .................. | B64C 1/0683 244/102 A |
| 9,096,311 B2 * | 8/2015 | Gleyze | .................... | B64C 25/16 |

(Continued)

FOREIGN PATENT DOCUMENTS

| | | |
|---|---|---|
| FR | 2910875 | 7/2008 |
| FR | 2917369 | 12/2008 |
| WO | 2007/057400 | 5/2007 |

OTHER PUBLICATIONS

French Search Report and Written Opinion for FR1858504 dated May 28, 2019, 6 pages.

*Primary Examiner* — Joseph W Sanderson
(74) *Attorney, Agent, or Firm* — Nixon & Vanderhye P.C.

(57) ABSTRACT

A front landing gear module for an aircraft is disclosed including an open box provided with at least one door and containing a deployable front landing gear. The module may be a one-piece module and also including an attachment system intended to attach it on the aircraft, which allows the module to be manufactured in advance, before it is integrated as an individual assembly into the structure of the fuselage of the aircraft.

20 Claims, 5 Drawing Sheets

(56) References Cited

U.S. PATENT DOCUMENTS

| | | | |
|---|---|---|---|
| 9,840,321 B2* | 12/2017 | Gallant | B64F 5/00 |
| 2008/0210813 A1* | 9/2008 | Guering | B64C 1/10 |
| | | | 244/102 R |
| 2009/0078822 A1 | 3/2009 | Wood | |
| 2010/0032521 A1* | 2/2010 | De Ruffray | B64C 25/14 |
| | | | 244/102 A |
| 2010/0176240 A1* | 7/2010 | Guering | B64C 1/061 |
| | | | 244/102 R |
| 2013/0134259 A1* | 5/2013 | Lieven | B64C 25/14 |
| | | | 244/102 A |
| 2016/0176513 A1* | 6/2016 | Gallant | B64F 5/00 |
| | | | 244/102 R |
| 2021/0031904 A1* | 2/2021 | Murray | B64C 1/0683 |

* cited by examiner

FRONT LANDING GEAR MODULE FOR AIRCRAFT

CROSS REFERENCE TO RELATED APPLICATION

This application claims priority to and incorporates by reference French Patent Application Number 1858504, filed Sep. 20, 2018.

BACKGROUND

1. Field of the Invention

The disclosure generally relates to an aircraft component and, more specifically, to a front landing gear module for an aircraft.

2. Description of the Related Art

The manufacturing time of an aircraft, particularly of a transport airplane, is an important criterion that aircraft manufacturers seek to reduce as much as possible, particularly for cost reasons.

Landing gear, and particularly the front landing gear, which are heavy and complex components, require significant manufacturing and installation durations. These durations detrimentally impact the manufacturing time of the aircraft.

SUMMARY

The present disclosure is embodied as a landing gear module for aircraft allowing the manufacturing time of the aircraft for which is intended to be reduced.

In an exemplary embodiment, the front landing gear module is a one-piece module and it comprises an open box, the box being provided with at least one door configured to be able to be opened and closed, the box containing a deployable front landing gear configured to be able to be deployed through the door, the front landing gear module comprising an attachment system intended to attach the front landing gear module on the aircraft.

Within the scope of the present invention, "one-piece module" is understood to be a module that is a single or individual block (i.e. which corresponds to a single object).

Thus, by virtue of the invention, the front landing gear forms part of a module, that is, an individual assembly, capable of being mounted directly on the aircraft.

This front landing gear module is pre-manufactured and pre-assembled, before being integrated into the structure of the fuselage of the aircraft, which may be at a later stage in the manufacturing process. This modularity allows different operations (and in particular the manufacture of the front landing gear module) to be carried out at the same time (or simultaneously) when manufacturing the aircraft, the particular advantage of which is to reduce the overall manufacturing time of the aircraft.

The front landing gear may be a landing gear that is mounted under the aircraft at the front of the aircraft. This front landing gear can be oriented, for example, to allow orientation of the taxiing direction when the aircraft is taxiing on the ground.

The box may have an aerodynamic outer shape corresponding to a predetermined shape for a bottom front part of the fuselage of the aircraft in order to be directly introduced into the fuselage while creating aerodynamic continuity, when the module is integrated in the aircraft.

In an exemplary embodiment, the box is provided with a door frame and with two adjacent doors, each linked to a part of this door frame.

In an exemplary embodiment, the attachment system comprises link elements, for example, two connecting rods, to which at least the front landing gear is linked, the link elements being configured to be able to be linked to the aircraft. The front landing gear module may further comprise a plurality of strengthening elements, for example, strengthening link rods, with each of the strengthening elements linking one of the link elements to the box, and in particular to the door frame.

Furthermore, the attachment system may be configured to provide a supplementary attachment of an upper edge of the box, surrounding the opening of the open box.

Furthermore, the box may comprise a flat front bulkhead, and/or the box may be provided with at least one access hatch granting access (from the outside) to the inside of the box.

The present invention also relates to an aircraft, for example, a transport airplane.

According to an exemplary embodiment, the aircraft is provided with a front landing gear module as described above.

The aircraft may comprise a bay at the front under the cockpit, in which bay the front landing gear module is attached.

In an exemplary embodiment, the wall of the bay is formed by a plurality of adjacent sectors (or sections), at least some of which are preferably substantially flat, whereas in a second embodiment the wall of the bay has a generally curved (continuous) shape.

Furthermore, the aircraft may comprise, in the bay front and rear attachment supports for the link elements, and attachment supports for the door frame.

In addition, the aircraft is provided with a supplementary attachment of the upper edge of the box on the fuselage of the aircraft.

Moreover, a front bulkhead of the landing gear module matches a front bulkhead of the fuselage of the aircraft, the front bulkheads (of the module and of the fuselage) forming a single, preferably flat, wall when the front landing gear module is attached on the aircraft.

In addition, an aerodynamic outer wall of the box of the front landing gear module corresponds to a bottom front part of the fuselage of the aircraft.

BRIEF DESCRIPTION OF THE DRAWINGS

For an understanding of embodiments of the disclosure, reference is now made to the following description taken in conjunction with the accompanying drawings, in which.

In the accompanying drawings, like reference characters refer to the same or similar parts throughout the different views. The drawings are not necessarily to scale, emphasis instead being placed upon illustrating particular principles, discussed below.

DETAILED DESCRIPTION OF EMBODIMENTS

Some embodiments will now be described with reference to the Figures.

Figure 1:
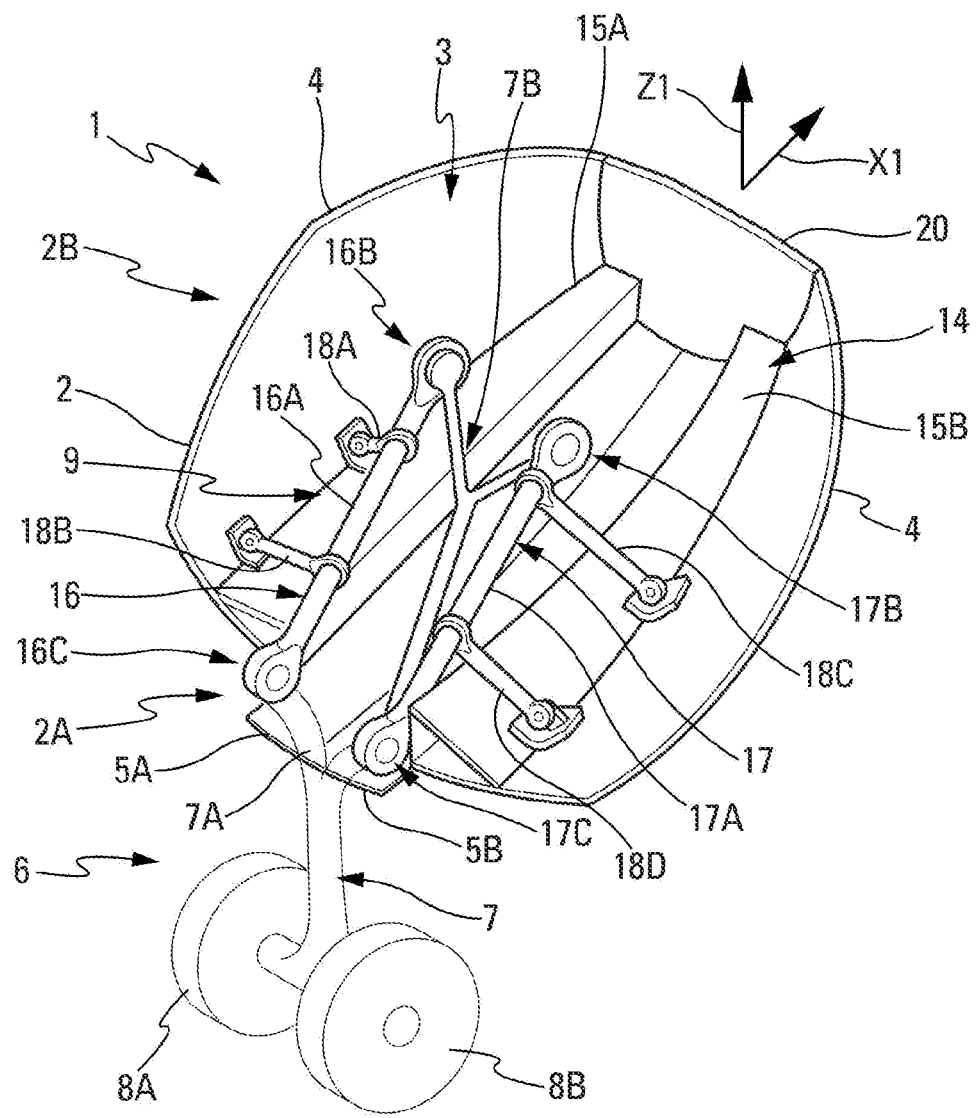
FIG. 1 is a schematic perspective view of an exemplary embodiment of a front landing gear module.
Figure 2:
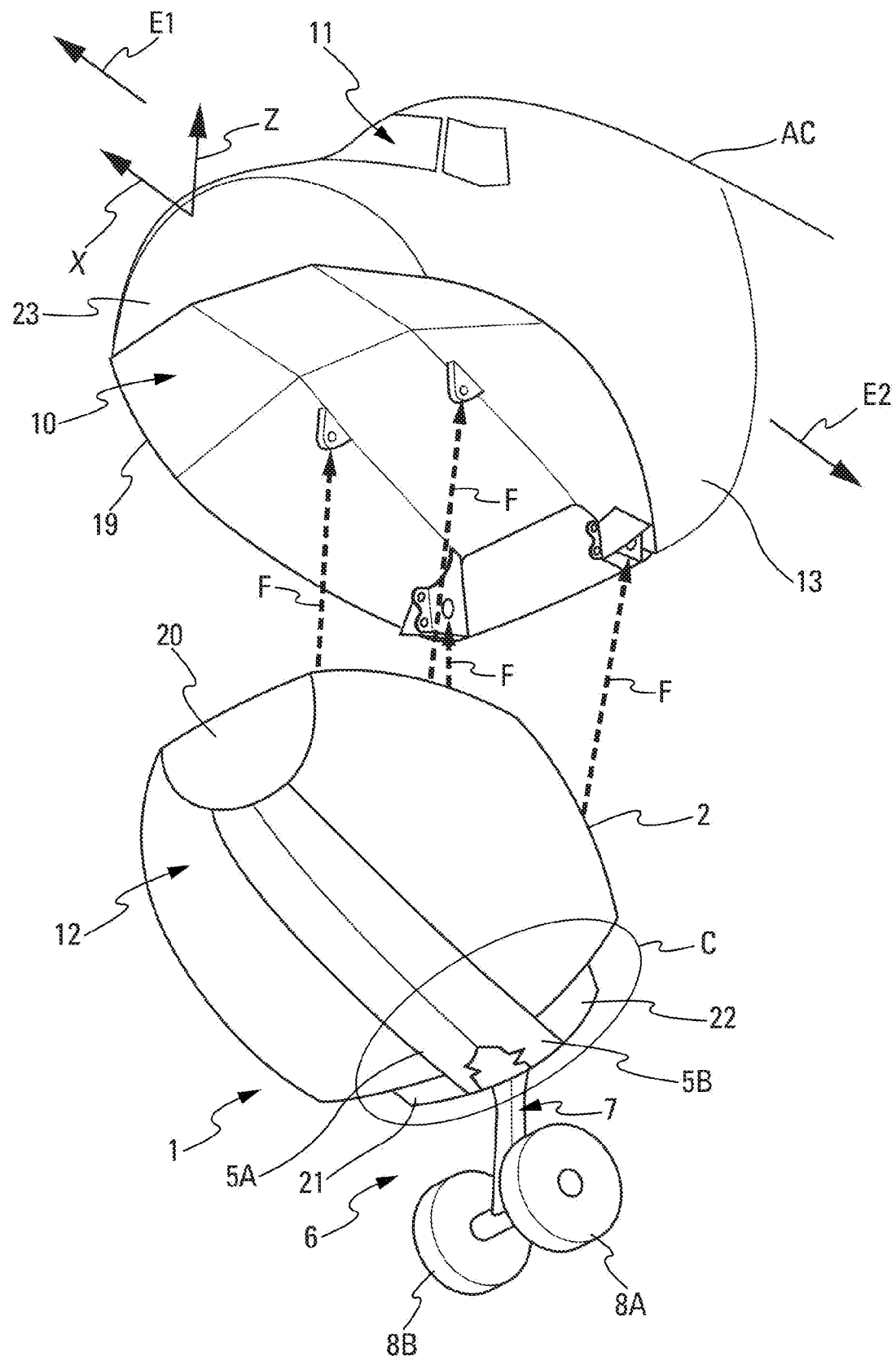
FIG. 2 is a schematic perspective view of a front landing gear module during a phase of integration on an aircraft (partially shown)

The front landing gear module (hereafter called "module") 1, which is schematically shown in a particular embodiment in FIG. 1, is configured to be attached on an aircraft AC, for example, on a transport airplane, as shown in FIG. 2.

Throughout the disclosure, the "front" and "rear" directions are defined relative to the longitudinal direction of the aircraft AC, namely for "front" (as shown by an arrow E1 in FIG. 2) towards the front of the aircraft AC in the direction of flight (or of movement) of the aircraft AC, and for "rear" (as shown by an arrow E2 in FIG. 2) towards the rear of the aircraft AC in the opposite direction to the direction of flight (or of movement) of the aircraft AC.

Moreover, the terms "lower", "upper", "bottom" and "top", when they are applied to the aircraft AC, are defined relative to a direction, called vertical direction Z, relative to the aircraft AC. As shown in FIG. 2, this vertical direction Z is such that it forms, with a direction, called longitudinal direction X (which is defined along the longitudinal axis of the aircraft AC), a plane (called vertical plane) of symmetry of the aircraft AC.

Similarly, the terms "lower", "upper", "bottom" and "top", when they are applied to the module 1, are defined in a vertical direction Z1 defined relative to the module 1, as shown in FIG. 1. This vertical direction Z1 and a longitudinal direction X1, orthogonal to each other, are such that, in the assembled position of the module 1 (in which it is fully integrated in the aircraft AC), they are respectively parallel to the directions Z and Y defined relative to the aircraft AC.

According to an exemplary embodiment, the module 1 comprises a box 2, as shown in FIG. 1 in particular. This box 2 is open, with an opening 3 provided over the whole of its top (or upper) part 2B. This opening 3 forms an upper edge 4.

The box 2 is provided with at least one door and preferably with two doors 5A and 5B in its bottom (or lower) part 2A. These doors 5A and 5B are configured to be able to be opened and closed. In the closed position of the doors 5A and 5B, the bottom part 2A of the box 2 is fully closed.

The box 2 contains a deployable front landing gear 6. This landing gear 6, which is schematically shown in FIG. 1, is of the conventional type. This front landing gear 6 comprises, in addition to a wheel support 7 and orientable wheels 8A and 8B, all the conventional elements of a landing gear.

The front landing gear 6 is configured to be able to be conventionally deployed through the doors 5A and 5B when they are opened. For the sake of simplification of the drawing, in FIG. 1, a thin line shows the deployed position of the front landing gear 6, although the doors 5A and 5B are closed. Of course, this deployment only occurs with the doors 5A and 5B opened.

The module 1 further comprises an attachment system 9 configured to attach the module 1 on the aircraft AC.

Figure 4:
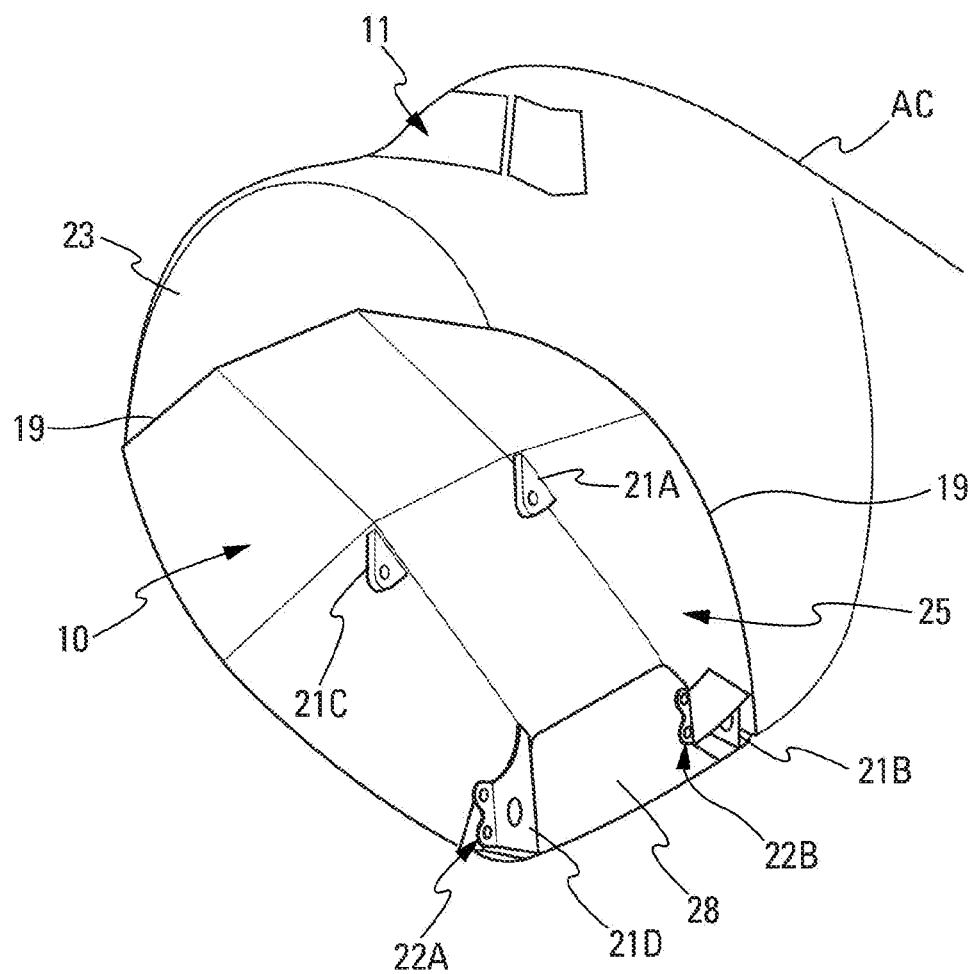
FIG. 4 is a schematic perspective view of a front part of an aircraft provided with a bay intended to house a front landing gear module.

Referring to FIGS. 2 and 4, the aircraft AC comprises a bay 10 at the front under the cockpit 11, in which bay the module 1 (front landing gear module) is attached.

As shown in FIG. 2, the box 2 of the module 1 has an aerodynamic outer wall 12, the shape of which matches a conventional predetermined shape of the bottom front part of the fuselage 13 of the aircraft so that, when the box 2 is integrated in the bay 10, the aircraft AC has a conventional continuous aerodynamic shape. This continuous aerodynamic shape is formed by the fuselage 13 and the outer aerodynamic wall 12 of the box 2. The aerodynamic outer wall 12 of the box 2 therefore corresponds, in the assembled and attached position, to a bottom front part of the overall fuselage of the aircraft AC, by closing the bay 10.

In an exemplary embodiment, the box 2 is provided with a door frame (or framing) 14, as shown in FIG. 1. This door frame 14 particularly comprises two strengthening spars 15A and 15B arranged in the direction X1. These spars 15A and 15B preferably have an elongated box structure, for example, with a transverse triangular section or other section. Each of the doors 5A and 5B is linked to a spar 15A, 15B of the door frame 14.

The door frame 14 that is thus formed allows the resistance of the box 2 to be strengthened at the doors 5A and 5B.

Moreover, in an exemplary embodiment, the attachment system 9 comprises link elements, to which the front landing gear 6 is linked. In a preferred embodiment, which is particularly shown in FIG. 1 and is described hereafter, the attachment system 9 comprises two connecting rods 16 and 17 as link elements. These connecting rods 16 and 17 are configured to be able to be linked to the aircraft AC, as specified hereafter.

The connecting rod 16 comprises, as shown in FIG. 1, a rigid rod 16A, provided at the ends thereof with a front hinge 16B and a rear hinge 16C.

Similarly, the connecting rod 17 comprises a rigid rod 17A, provided at the ends thereof with a front hinge 17B and a rear hinge 17C.

The front landing gear 6 is linked, at the rear, to the connecting rods 16 and 17 at the hinges 16C and 17C by means of a mechanical part 7A, for example, in the form of a fork. This mechanical part 7A is linked to the wheel support 7.

Furthermore, the front landing gear 6 is linked, at the front, to the connecting rods 16 and 17 at the front hinges 16B and 17B by means of a mechanical part 7B that is also in the form of a fork.

The connecting rods 16 and 17 also can have, in addition to a spacer function, a function of gripping the module 1, implemented by means of a suitable tool, when, for example, assembling the module 1.

The link elements of the attachment system 9 may also be produced in the form of other structural elements, for example, in the form of fittings or in the form of panels that connect to underlying boxes.

The module 1 may further comprise a plurality of strengthening elements. For example, as shown in FIG. 1, these strengthening elements are strengthening link rods 18A, 18B, 18C and 18D. Each of these link rods 18A to 18D links one of the connecting rods 16 and 17 to the box 2.

More specifically, each of the link rods 18A and 18B is linked in a hinged manner, on the one hand, to the rod 16A of the connecting rod 16 and, on the other hand, to the spar 15A of the door frame 14 that is integrated in the box 2.

Similarly, each of the link rods 18C and 18D is linked in a hinged manner, on the one hand, to the rod 17A of the connecting rod 17 and, on the other hand, to the spar 15B of the door frame 14 that is integrated in the box 2.

These link rods 18A to 18D (in association with the connecting rods 16 and 17) allow the structural rigidity of the box 2 to be enhanced, doing so both:
  when the box 2 is transported and moved, before and during its installation on the aircraft AC; and
  when it is integrated in the aircraft AC, by helping to strengthen the overall rigidity of the fuselage of the aircraft AC.

In an exemplary embodiment, it is possible to contemplate, for example to reducing the spatial requirement and the mass, disassembling the link rods 18A to 18D after the module 1 is integrated in the aircraft AC.

Moreover, the strengthening elements may also be produced in the form of other structural elements, for example, in the form of fittings.

Moreover, in addition to the main attachment provided by the connecting rods 16 and 17, the attachment system 9 is configured to provide a supplementary (or secondary) attachment. The purpose of this supplementary attachment is to attach the upper edge 4 of the box 2, surrounding the opening 3 of the box 2, on an outer edge 19 of the bay 10 (FIGS. 2 and 4). Outer edge is understood to be the edge of the bay that is located towards the outside of the aircraft in the vicinity of the fuselage 13. To this end, the upper edge 4 comes into contact with the outer edge 19 in order to create an outer face of the assembly formed by the aircraft AC and the integrated module 1, which is aerodynamic.

The upper edge 4 may be attached against the outer edge 19 of the bay 10 in various ways. For example, it can be attached by rivets, such as but not limited to blind rivets. Such an attachment is possible due to access from the outside, the lack of a requirement for air-tightness and reduced loads.

The supplementary attachment may also be provided by fitting together the upper edge 4 and the outer edge 19 of the bay 10, by providing suitable matching shapes for these edges 4 and 19.

Moreover, as shown in FIGS. 1 and 2, the box 2 comprises a flat front bulkhead 20.

Figure 3:
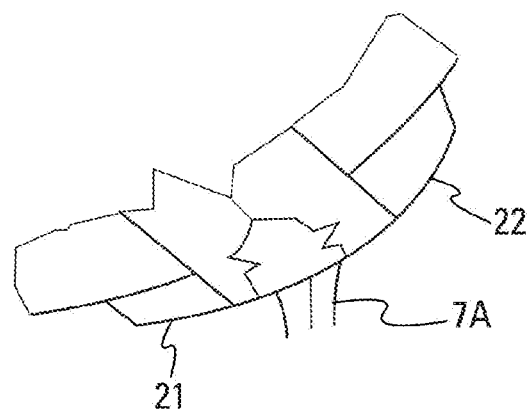
FIG. 3 is a partial and perspective schematic view of part of a box of the front landing gear module of FIG. 2, illustrating access hatches.

Furthermore, in a particular embodiment, the box 2 is also provided with access hatches 21 and 22, as shown in FIG. 3 (which shows the part of the box 2 that is surrounded by a closed line C in FIG. 2). These hatches 21 and 22 grant access to the inside of the box 2, particularly for accessing elements for attaching the front landing gear, which are specified hereafter.

The aircraft AC, for which the module 1 is intended, therefore must comprise a bay 10 at the front under the cockpit 11, as shown in FIG. 4, in which bay the module 1 is attached. The aircraft AC therefore has a configuration called open bay configuration.

As shown in FIG. 4, the aircraft AC particularly comprises, in the bay 10:
  a front attachment support 21A and a rear attachment support 21B for the connecting rod 16. More specifically, the front hinge 16B of the connecting rod 16 is linked to (and hinged with) the front attachment support 21A and the rear hinge 16C of the connecting rod 16 is linked to (and hinged with) the rear attachment support 21B; and
  a front attachment support 21C and a rear attachment support 21D for the connecting rod 17. More specifically, the front hinge 17B of the connecting rod 17 is linked to (and hinged with) the front attachment support 21C and the rear hinge 17C of the connecting rod 17 is linked to (and hinged with) the rear attachment support 21D.

The bay 10 is also provided with attachment supports 22A and 22B for the door frame 14, which are arranged close to the attachment supports 21D and 21B.

These attachment supports (mainly 21A to 21D and also 22A and 22B) allow the loads to be transferred to the fuselage. They provide the main attachment of the box 2 and of the front landing gear 6 on the aircraft AC. Furthermore, the aircraft AC comprises a supplementary (or secondary) attachment of the upper edge 4 of the box 2 on the fuselage of the aircraft, as indicated above.

The outer wall 25, 26 of the bay 10 (i.e. the wall located towards the outside of the aircraft AC) that is sealed can be produced in various ways. The selected manner particularly depends on the structural resistance of the wall that is obtained and on manufacturing criteria (time, cost, etc.).

The internal part 42 (FIGS. 6 to 8) of the aircraft AC, which is externally demarcated by the wall 25, 26 of the bay 10, is pressurized. The wall 25, 26 therefore must be configured to be able to withstand the pressure generated by the pressurization.

In an exemplary embodiment, the bay 10 has a wall 25 may comprise a plurality of adjacent sectors 27A to 27F (in particular panels). For example, although not exclusively, at least some of these sectors are flat, as is particularly shown in FIGS. 4 and 5. The wall 25 also comprises a strengthened rear bulkhead 28, shown in FIG. 4.

In an exemplary embodiment, the sectors 27E and 27F and the bulkhead 28 are substantially flat, and the sectors 27A to 27B are slightly curved. The sectors 27A to 27F and the bulkhead 28 can be positioned one relative to the other (and relative to the fuselage of the aircraft) to maximize the pressure resistance of the wall 25.

Figure 5:
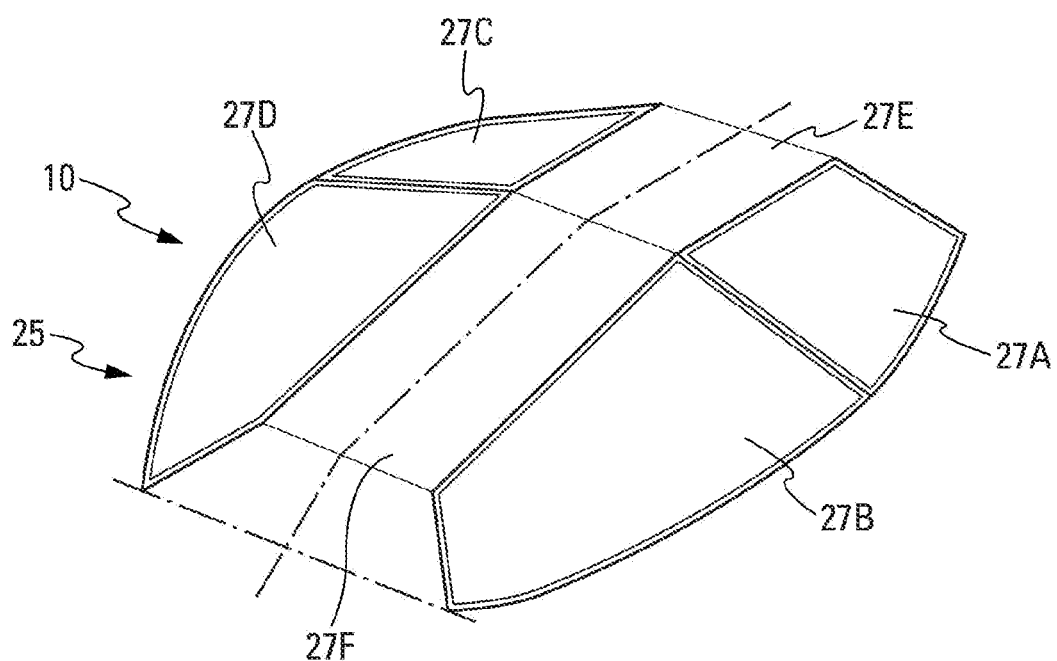
FIG. 5 is a schematic perspective view of a wall of an aircraft bay provided with a plurality of adjacent sections.
Figure 6:
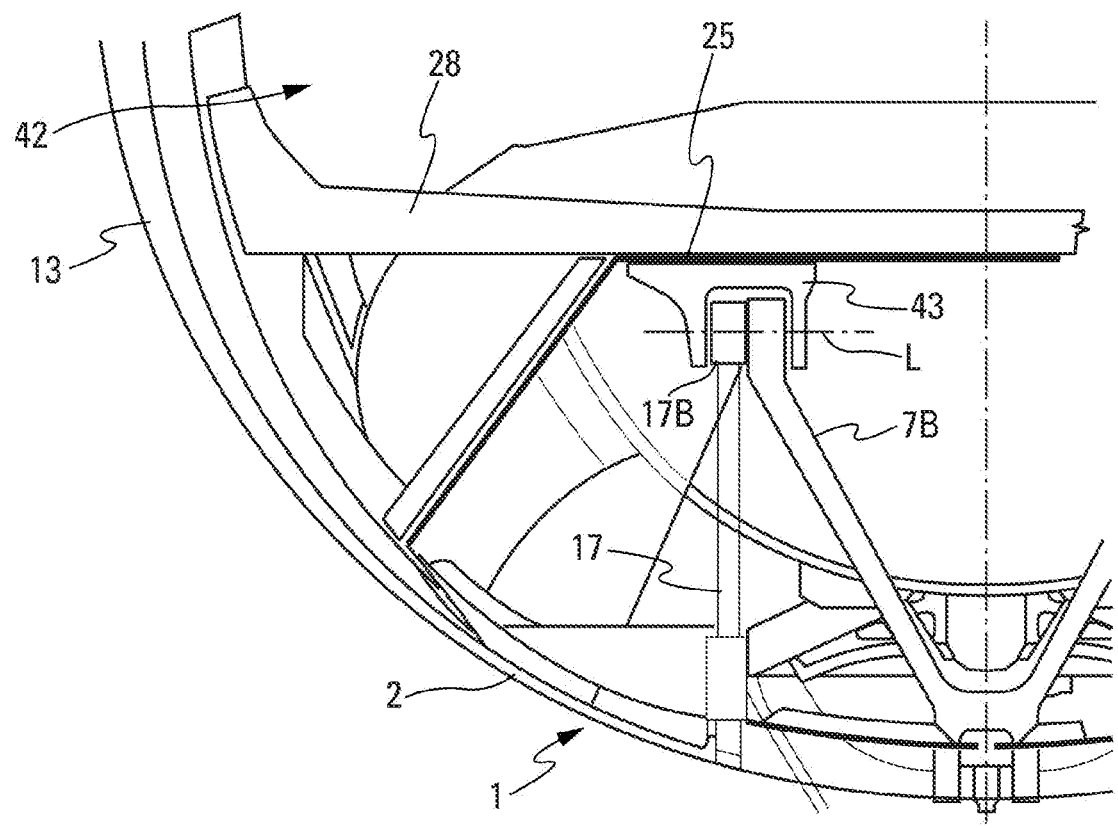
FIG. 6 is a partial section view showing a first mode of attaching a front landing gear module in a bay having a wall such as that of FIG. 5.

FIG. 6, which relates to a first possible mode of attaching the module 1 on a bay 10 having a wall 25 such as that of FIGS. 4 and 5, shows a fitting 43, for example, showing the attachment support 21C, on which the front hinge 17B of the connecting rod 17 and an arm of the mechanical part 7B in the form of a fork are both hinged, through a hinge axis L.

Each of the ends 16B and 17B of the connecting rods 16 and 17 is hinged in such a respective fitting 43.

Furthermore, the fitting 43 is attached to a transverse beam 28. In addition to acting as an attachment part for the fitting 43, and therefore for part of the module 1, this beam 28, which is linked on both sides to the fuselage 13, enables strengthening of the structural rigidity of the internal part 42 of the aircraft AC that is pressurized.

Figure 7:
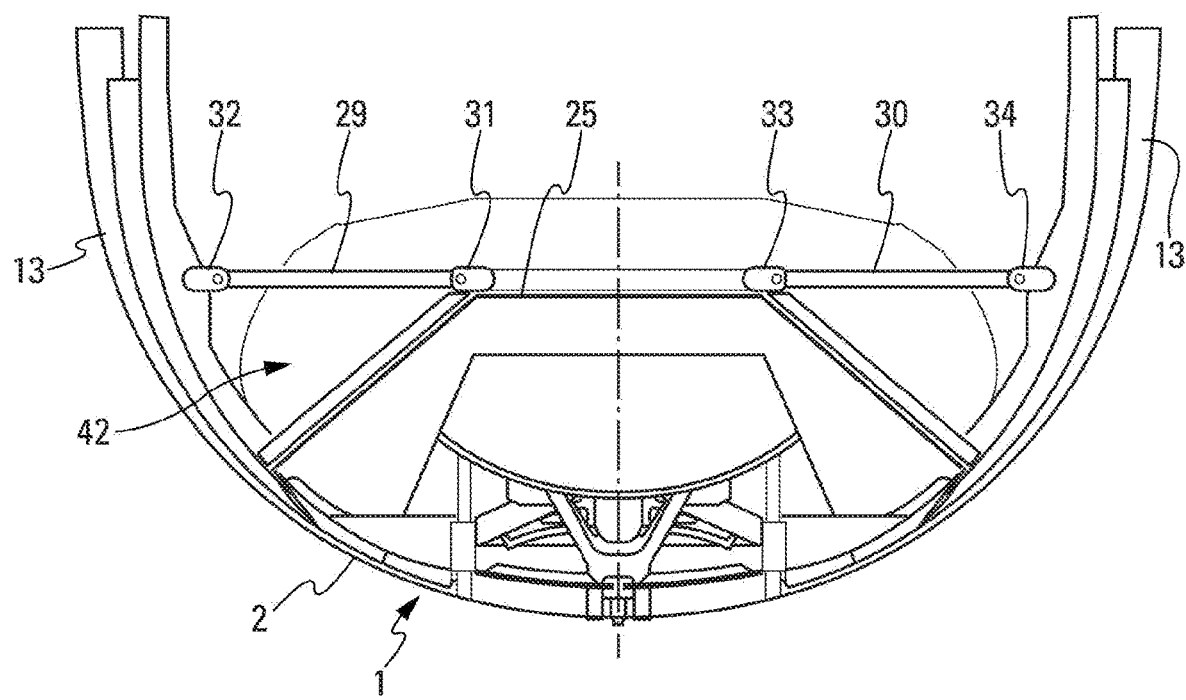
FIG. 7 is a section view showing a second mode of attaching a front landing gear module in a bay having a wall such as that of FIG. 5; and, FIG. 8 is a section view showing a particular mode of attaching a front landing gear module in an aircraft bay having a curved wall.

FIG. 7 shows a second mode of attaching (and of structuring) the wall 25. In this second attaching mode, the beam 28 (of FIG. 6) is replaced by struts 29 and 30. The strut 29 is hinged, on the one hand, on a support part 31 attached to the wall 25 and, on the other hand, on a support part 32 attached to the inside of the fuselage 13.

Similarly, the strut 30 is hinged, on the one hand, on a support part 33 attached to the wall 25 and, on the other hand, on a support part 34 attached to the inside of the fuselage 13.

Figure 8:
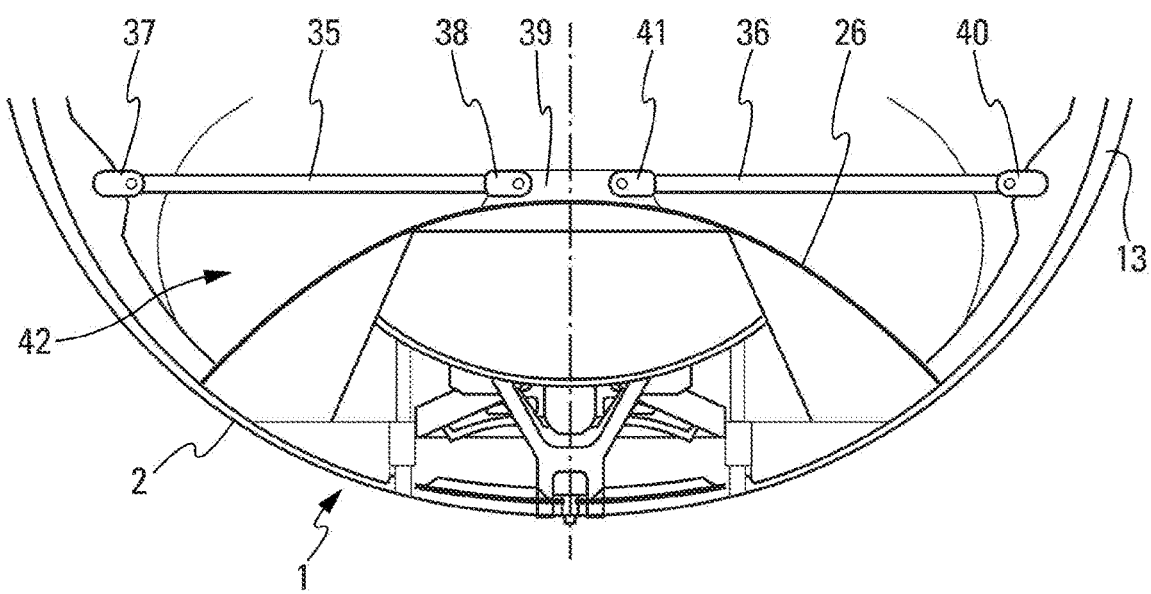

In an exemplary embodiment, the wall 26 of the bay has a curved outer shape, as shown in FIG. 8.

FIG. 8 shows a mode for attaching the wall 26. This attaching mode comprises struts 35 and 36. The strut 35 is hinged, on the one hand, on a support part 37 attached to the inside of the fuselage 13 and, on the other hand, on a support part 38 attached to a link part 39 rigidly connected to the wall 26.

Similarly, the strut 36 is hinged, on the one hand, on a support part 40 attached to the inside of the fuselage 13 and, on the other hand, on a support part 41 attached to the link part 39 rigidly connected to the wall 26.

Furthermore, the substantially flat front bulkhead 20 of the box 2 matches a front bulkhead 23, which may also substantially flat, of the fuselage of the aircraft AC, as shown in FIG. 2. These front bulkheads 20 and 23 form a preferably flat single wall when the module 1 is attached on the aircraft AC. Conventionally, an ogive part (not shown), generally a radome, is arranged at the front of the aircraft on this wall. Preferably, the front bulkhead 20 is sealed, in particular to prevent dust or other elements from penetrating the radome, particularly when the doors 5A and 5B are open.

Consequently, within the scope of the present invention, the components of the front landing gear 6 are consolidated in the module 1. This module 1 is installed on the aircraft AC outside the pressurized zone (particularly comprising the part 42) of the aircraft AC, so that it does not have to withstand the pressure generated by the pressurization.

The method for manufacturing and installing the module 1, as described above, particularly comprises the following steps:
- a manufacturing step, during which the front landing gear module 1 is manufactured and assembled, with all the parts described above and particularly with the front landing gear 6; and
- an assembly (or mounting) step, during which the module 1, as an individual assembly, is integrated into the structure of the fuselage 13 of the aircraft AC, preferably at a later stage in the manufacturing process of the aircraft, by being brought into a position in the bay 10, as shown by the arrows F in FIG. 2, and by being attached.

Thus, by virtue of the invention, the front landing gear 6 of the aircraft AC forms part of a module 1, i.e. an individual (one-piece) assembly that is able to be directly mounted (as an individual assembly) on the aircraft AC in the bay 10.

This modularity allows manufacturing and assembly operations to be performed at the same time (or simultaneously) when manufacturing the aircraft, the particular advantage of which is to reduce the overall manufacturing time of the aircraft.

For example, it is possible to perform tests on the deployment of the front landing gear 6 and tests on the opening and/or adjustment of the doors 5A and 5B on the module 1. These tests and adjustments, which are performed during the stage of manufacturing the module 1, increase the effectiveness (time and cost) of the assembly. The operation for mounting the module 1 in the structure of the fuselage 13 of the aircraft AC is limited to attaching it and to connecting the various elements.

The module 1, as described above, may allow the following to be obtained:
- a reduction in the mass of all the parts relating to the front landing gear; and
- a reduction in the cost (particularly the manufacturing cost) associated with the integration of the front landing gear on the aircraft.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A front landing gear module for an aircraft, comprising:
   - an open box provided with at least one door configured to be able to be opened and closed,
   - the box containing a deployable front landing gear configured to be deployed through the door,
   - an attachment system configured to attach the front landing gear module on the aircraft and comprises link elements, to which at least the front landing gear is linked, said link elements being configured to be able to be linked to the aircraft, and
   - a plurality of strengthening elements, with each of said strengthening elements linking one of said link elements to said box.

2. The front landing gear module according to claim 1, wherein the box has an aerodynamic outer shape corresponding to a predetermined shape for a bottom front part of a fuselage of the aircraft.

3. The front landing gear module according to claim 1, wherein the box further comprises a door frame and two adjacent doors, each linked to a part of the door frame.

4. The front landing gear module according to claim 1, wherein the attachment system is configured to provide a supplementary attachment of an upper edge of the box, surrounding the opening of the open box.

5. The front landing gear module according to claim 1, wherein the box comprises a flat front bulkhead.

6. The front landing gear module according claim 1, wherein the box further includes at least one access hatch granting access to the inside of the box.

7. An aircraft comprising a front landing gear module according to claim 1.

8. The aircraft according to claim 7, further comprising a bay at the front under a cockpit, in which bay the front landing gear module is attached.

9. The aircraft according to claim 8, wherein the wall of the bay is formed by a plurality of adjacent sectors.

10. The aircraft according to claim 9, wherein the wall of the bay has a curved shape.

11. The aircraft according to claim 7, further comprising in the bay front and rear attachment supports for the link elements, and attachment supports for a door frame.

12. The aircraft according to claim 7, comprising a supplementary attachment of the upper edge of the box on the fuselage of the aircraft.

13. The aircraft according to claim 7, wherein a front bulkhead of the front landing gear module matches a front bulkhead of the fuselage of the aircraft, the front bulkheads forming a single wall when the front landing gear module is attached on the aircraft.

14. The aircraft according to claim 7, wherein an aerodynamic outer wall of the box of the front landing gear module corresponds to a bottom front part of the fuselage of the aircraft.

15. A one-piece aircraft front landing gear module, comprising:
an open box provided with at least one door configured to be able to be opened and closed,
the box containing a deployable front landing gear configured to be deployed through the door,
an attachment system configured to attach the front landing gear module on the aircraft and comprises link elements, to which at least the front landing gear is linked, said link elements being configured to be able to be linked to the aircraft,
a plurality of strengthening elements, with each of said strengthening elements linking one of said link element to said box, and
wherein the box includes an aerodynamic outer surface corresponding to a predetermined shape for a bottom front part of a fuselage of the aircraft.

16. A front landing gear module for an aircraft, comprising:
a housing bounding an opening provided with at least one door configured to open and close,
a front aircraft landing gear,
a plurality of links operably securing the front aircraft landing gear to and within the housing, the front landing gear being configured to deploy through the at least one door, and
an attachment system configured to attach the housing to the aircraft.

17. The front landing gear module according to claim 16, wherein the housing has an aerodynamic outer shape corresponding to a predetermined shape for a bottom front part of a fuselage of the aircraft.

18. The front landing gear module according to claim 16, wherein the housing comprises a flat front bulkhead.

19. The front landing gear module according to claim 16, wherein the housing further includes at least one access hatch granting access to the inside of the box.

20. An aircraft comprising a front landing gear module according to claim 16.

* * * * *